(12) United States Patent
Umkehrer et al.

(10) Patent No.: US 11,480,456 B2
(45) Date of Patent: Oct. 25, 2022

(54) THERMAL FLOWMETER

(71) Applicants: Endress+Hauser Wetzer GmbH+Co. KG, Nesselwang (DE); Innovative Sensor Technology IST AG, Ebnat-Kappel (CH)

(72) Inventors: Alfred Umkehrer, Hopferau (DE); Florian Krogmann, Kreuzlingen (CH)

(73) Assignees: Endress+Hauser Wetzer GmbH+Co. KG, Nesselwang (DE); Innovative Sensor Technology IST AG, Ebnat-Kappel (CH)

( * ) Notice: Subject to any disclaimer, the term of this patent is extended or adjusted under 35 U.S.C. 154(b) by 0 days.

(21) Appl. No.: 16/632,486

(22) PCT Filed: Jun. 20, 2018

(86) PCT No.: PCT/EP2018/066445
§ 371 (c)(1),
(2) Date: Jan. 20, 2020

(87) PCT Pub. No.: WO2019/015912
PCT Pub. Date: Jan. 24, 2019

(65) Prior Publication Data
US 2020/0271496 A1    Aug. 27, 2020

(30) Foreign Application Priority Data
Jul. 20, 2017    (DE) ..................... 10 2017 116 408.1

(51) Int. Cl.
*G01F 1/692*    (2006.01)
*G01P 5/12*    (2006.01)

(52) U.S. Cl.
CPC ............. *G01F 1/692* (2013.01); *G01P 5/12* (2013.01)

(58) Field of Classification Search
CPC ......................................................... G01F 1/692
(Continued)

(56) References Cited

U.S. PATENT DOCUMENTS

| 8,590,360 B2 | 11/2013 | Kramer et al. |
| 2004/0188808 A1* | 9/2004 | Artmann ............ B81C 1/00492 257/628 |
| 2008/0184790 A1 | 8/2008 | Ding et al. |

FOREIGN PATENT DOCUMENTS

| CN | 101126653 A | 2/2008 |
| CN | 103940847 A | 7/2014 |

(Continued)

OTHER PUBLICATIONS

Alofi et al. "Thermal conductivity of graphene and graphite." Physical Review B 87.11 (2013): 115421. (Year: 2013).*

(Continued)

*Primary Examiner* — Walter L Lindsay, Jr.
*Assistant Examiner* — Philipmarcus T Fadul
(74) *Attorney, Agent, or Firm* — Christopher R. Powers; Endress+Hauser (USA) Holding Inc.

(57) ABSTRACT

The present disclosure relates to an apparatus for determining and/or monitoring the mass flow and/or flow velocity of a flowable medium through a pipeline, comprising at least one heating element, which is at least partially and/or at times in thermal contact with the medium and is operable at least at times by means of a heating signal. Furthermore, the present disclosure relates to a method for producing an apparatus of the disclosure. According to the disclosure, the heating element is at least partially surrounded in a region facing the medium by a unit comprising a material with an anisotropic thermal conductivity.

16 Claims, 2 Drawing Sheets

(58) Field of Classification Search
USPC .................................................... 73/204.26
See application file for complete search history.

(56) References Cited

FOREIGN PATENT DOCUMENTS

| | | |
|---|---|---|
| CN | 104597078 A | 5/2015 |
| DE | 102005057687 A1 | 6/2007 |
| DE | 102007055779 A1 | 6/2008 |
| DE | 102007023823 A1 | 11/2008 |
| DE | 102014119223 B3 | 3/2016 |
| DE | 102017100267 A1 | 7/2018 |
| JP | H0296619 A | 4/1990 |
| JP | H04254716 A | 9/1992 |
| WO | 2008142075 A1 | 11/2008 |
| WO | 2010023255 A1 | 3/2010 |

OTHER PUBLICATIONS

Kaiser et al. Translation of WO2016192929. Published Dec. 2016. Translated Mar. 2021. (Year: 2016).*

* cited by examiner

THERMAL FLOWMETER

CROSS-REFERENCE TO RELATED APPLICATIONS

The present application is related to and claims the priority benefit of German Patent Application No. 10 2017 116 408.1, filed on Jul. 20, 2017 and International Patent Application No. PCT/EP2018/066445, filed on Jun. 20, 2018, the entire contents of which are incorporated herein by reference.

TECHNICAL FIELD

The invention relates to an apparatus for determining and/or monitoring mass flow and/or flow velocity of a flowable medium through a pipeline and to a method for producing an apparatus of the invention. The apparatus includes a heating element, which is at least partially and/or at times in thermal contact with the medium and which is operable at least at times by means of a heating signal.

BACKGROUND

Thermal or also calorimetric flowmeters are often applied in process- and/or automation technology. Corresponding field devices are produced and sold by the applicant, for example, under the marks, t-switch, t-trend and t-mass. The measuring principles underpinning thermal or also calorimetric flowmeters are known per se from the state of the art. Fundamentally, the flow, especially the mass flow, can be determined in two different ways.

In the case of a first measuring principle, a sensor element is exposed to a medium flowing through a pipeline and heated in such a manner that its temperature remains essentially constant. In the case of known, and at least at times constant, properties of the medium, properties such as the temperature of the medium, its density or even its composition, the mass flow of the medium flowing through the pipeline can be ascertained from the heating power needed for keeping the temperature at the constant value. The temperature of the medium is, in such case, that temperature, which the medium has without an additional heat input of a heating element.

In the case of an alternative measuring principle, in contrast, the heating element is operated with constant heating power and the temperature of the medium measured downstream from the heating element. In such case, the measured temperature of the medium gives information concerning mass flow.

In the case of both described measuring principles, especially in the case of variable temperature of the medium, moreover, a second sensor element can be used for temperature measurement of the medium.

The heating elements of thermal flowmeters are frequently embodied in the form of resistance heaters. For example, so-called resistance elements, e.g., RTD (resistance temperature detector) resistance elements, especially platinum elements, are applied, such as commercially obtainable under the designations, PT10, PT100 and PT1000. The resistance elements are heated via the conversion of electrical power supplied to them, e.g., as a result of an increased electrical current supply.

For registering mass flow and/or flow velocity, the heating element is brought at least at times and/or partially in thermal contact with the medium. In this regard, the sensor element can, for example, either be placed directly at or in the pipeline, or be integrated into a sensor head, which, in turn, is installable into an existing pipeline. These two and also other options described in the state of the art are subject matter of the present invention.

The determining of flow is based fundamentally on the knowledge that the thermal junction resistance between the particular sensor element and the flowing medium changes as a function of flow velocity. If, for example, no flow is occurring in the pipeline, the draining of heat from the heating element occurs via heat conduction, heat radiation and, in given cases, also via free convection within the medium. For maintaining a certain temperature difference according to the first of the two described measuring principles then, for example, an amount of heat constant with time is required. In the case of the presence of a flow, in contrast, there results an additional cooling of the sensor element by the flowing, especially colder, medium. An additional heat transport occurs due to forced convection. Correspondingly, as a result of a flow, an increased heating power must be supplied, in order to be able to maintain a fixed temperature difference.

The functional relationship between the heating power, or measured temperature, and the mass flow and/or flow velocity of the medium through the pipeline can also be expressed by means of the so-called heat transfer coefficient. In addition, various thermophysical properties of the medium as well as the pressure reigning in the pipeline have an influence on the measured flow. In order to take into consideration also the dependence of the flow on these variables, for example, different thermophysical properties in the form of characteristic lines or as components of functional equations are stored within an electronics unit of the flowmeter.

For a high accuracy of measurement, basically the thermal contact between the heating element and the flowing medium is decisive. Thus, for example, a change of thermal resistance of the heating element, which leads to a change of the heat transfer from the heating element to the medium in the case of otherwise constant flow conditions, can bring about considerable measured value error. A change of thermal resistance caused in such a manner is also referred to as sensor drift.

Regarding thermal resistance in a flowmeter, a distinction is made between an inner and an outer thermal resistance. The inner thermal resistance depends, among other things, on individual components within the sensor element, e.g., within the sleeves. Thus, sensor drift can come from defects in soldered connections due to tensile loadings from material expansion or the like. The outer thermal resistance, in contrast, is influenced by accretion formation, material removal or material transformation (e.g., corrosion) on the surfaces of the particular sensor element contacting the medium. A change of the outer thermal resistance is, thus, relevant especially in the case of long periods of operation and/or contact with aggressive media. In the case of gaseous or vaporous media, the measurement of the mass flow or flow velocity can, moreover, also be degraded by condensate formation on at least one of the temperature sensors.

Besides the most varied of efforts to assure a stable thermal contacting using constructional measures, it is usual to detect, to monitor and/or to compensate occurring sensor drift. From DE102005057687A1, DE102007023823A1, U.S. Pat. No. 8,590,360B2 or even WO/2008/142075A1, relative to changes of the outer thermal resistance, various flowmeters are known, by means of which a diagnosis of the utilized sensor elements can be made. Thus, information concerning the condition of at least one of the utilized sensor elements can be gained. As regards the inner thermal resistance, localization of sensor drift is known, in turn, from DE102014119223B3. Especially, changes of the inner thermal resistance can be inferred.

SUMMARY

An object of the present invention is a flowmeter with a high accuracy of measurement, as well as a method for its manufacture.

This object is achieved by an apparatus as defined in claim 1 and by a method as defined in claim 13.

The apparatus of the invention serves for determining and/or monitoring mass flow and/or flow velocity of a flowable medium through a pipeline and includes a heating element, which is at least partially and/or at times in thermal contact with the medium and which is operable at least at times by means of a heating signal.

According to the invention, a unit comprising a material with an anisotropic thermal conductivity is arranged in at least a subregion between the medium and the heating element. In this regard, the most varied of embodiments are possible, which all fall within the scope of the present invention. The exact embodiment depends, in such case, on, among other things, the particular measuring device and the geometric situation. For example, the heating element and the unit can be arranged on top of one another or next to one another. The heating element can, however, also be surrounded at least partially by the unit in a region facing the medium. Such an embodiment can be used in connection with a thermometer known from the previously unpublished German patent application 102017100267.7 (CA 3049706), to which comprehensive reference is taken in the context of the present invention. It is to be noted here in the context of the present invention that the unit can be arranged directly between the heating element and the medium. Likewise, other intermediate layers can be located between the heating element and the unit, or between the unit and the medium. For example, a wall of the pipeline can be located between the unit and the medium.

For determining and/or monitoring mass flow and/or flow velocity of the medium, the heating element is placed in contact, especially thermal contact, with the medium. A heat exchange occurs between the apparatus and the medium. In such case, the thermal junction resistance between the sensor element and the flowing medium changes as a function of the reigning flow velocity. There occurs, thus, a heat flow, or a heat flux, from the heating element to the medium.

Many different situations are possible, in which the heat flow from the heating element to the medium is not homogeneous, or isotropic. For example, the heat flux from the heating element to the medium can lead to an anisotropic heat flow due to the particular, especially the structural, arrangement in a flowmeter. By way of example, different separations between different regions of the heating element and the medium as well as the quality of the different contacts within the measurement device can be cause for this. As a consequence, the thermal junction resistance is, in practice, not only dependent on the mass flow, but, also, on the flow direction of the medium, or the conditions of the installation, for example, the positioning relative to the flow direction of the medium.

Such is especially problematic when the measurement device is exposed to an at least timewise and/or partially dynamic and/or inhomogeneous thermal environment, for example, in the case of an application in a flowing medium with variable flow directions, for example, in the case an inhomogeneous flow profile.

Of course, a large number of other cases can lead to a shifting of the thermal contact resistance. As a result, considerable measurement error can occur. In order to prevent these problems according to the invention, the unit, which comprises, at least partially, the material with an anisotropic thermal conductivity, is arranged at least in a subregion between the medium and the heating element. Since the thermal conductivity of the unit is directionally dependent, the heat flow from the heating element to the medium for a measurement device can, in given cases, be advantageously influenced with targeting, for a certain contemplated application.

In a preferred embodiment, the unit is embodied to assure that the thermal junction resistance of the apparatus is independent of the flow direction of the medium, or independent of the reigning flow profile of the medium. Especially, the unit thus cares for assuring that a homogeneous heat flow can take place from the sensor head to the medium, especially independently of the thermal environment of the apparatus. Likewise, the unit preferably cares for assuring that the thermal junction resistance is independent of certain production tolerances and structurally related asymmetric geometric conditions in the region of the apparatus.

In an additional preferred embodiment of the apparatus of the invention, the unit comprises a layer or a coating, which is at least partially composed of the material with an anisotropic thermal conductivity. The layer preferably has in the longitudinal direction, thus, along a plane in parallel with the layer or coating, a greater thermal conductivity, than perpendicular thereto, i.e., perpendicular to the plane of the layer or coating. In this way, the heat flow is redistributed, with targeting, along the unit.

In an especially preferred embodiment, the unit comprises a thin film, which is composed at least partially of the material with an anisotropic thermal conductivity. The film has likewise preferably a higher thermal conductivity along its longitudinal axis than perpendicular thereto.

In an additional especially preferred embodiment, the material with an anisotropic thermal conductivity is a material at least partially containing carbon, especially graphite, or the material is hexagonal boron nitride.

In an embodiment of the apparatus, the heating element and/or the unit are/is at least partially arranged within a sensor head. Preferably, the unit is embodied and/or arranged in such a manner that it at least partially surrounds the temperature sensor and the measurement element. The unit cares, thus, for a heat distribution in the circumferential direction of the sensor head.

In such case, the apparatus advantageously includes a filler, which is arranged at least partially within the sensor head, and at least partially, preferably completely, fills an inner space of the sensor head. The unit, which is likewise arranged at least partially within the sensor head, is preferably likewise at least partially surrounded by the filler. The filler is especially a material with an essentially homogeneous thermal conductivity and/or thermal capacitance. The filler assures, thus, an essentially homogeneous, especially isotropic, heat flow within the sensor head. For example, the filler can be a cement, especially a mixture of magnesium oxide, zirconium silicate and magnesium phosphate.

It is likewise advantageous that the unit be embodied and/or arranged in such a manner that it has, in parallel with the circumferential direction of the sensor head, a higher, especially at least 10 times higher, especially at least 30 times higher, thermal conductivity than perpendicularly to the circumferential direction. This embodiment is especially advantageously used in an at least at times and/or partially dynamic and/or inhomogeneous thermal environment, for example, for applications in flowing media with inhomogeneous flow profile or even in the case of variable flow velocities.

Finally, it is likewise advantageous for the embodiment of the apparatus with a sensor head that the unit be secured at least partially in a subregion of a wall of the sensor head facing the interior of the sensor head. The unit is, thus, arranged in the region of the surface of the sensor head facing the medium. The unit provides a peripheral distribution of a heat flow along the surface of the sensor head. From the surface of the sensor head there takes place then, in the case of a corresponding embodiment of the sensor head, advantageously an essentially homogeneous heat flow to the medium.

For example, the unit is secured by means of at least a part of the fill substance, and/or by means of a securement element, for example, in the form of a tubular element, on the wall of the sensor head. The tubular element is especially a ceramic tube, which has an outer diameter, which essentially equals an inner diameter of the sensor head, or is slightly less than the inner diameter of the sensor head in such a manner that the tubular element can be arranged essentially accurately fit within the sensor head.

An alternative embodiment provides that the unit is secured to a wall of the pipeline or integrated into the pipeline. In this regard, all options known to those skilled in the art for securing the unit to the pipeline, for example, by means of an adhesive bond, soldering or the like, as well as all generally known options for integrating the unit into a pipeline, for example, by casting or the like, are possible, and fall within the scope of the present invention.

For this alternative embodiment, the heating element is advantageously placed at least sectionally on the unit in such a manner that the heating element is arranged in the medium far region of the unit. In such case, the unit is located, thus, at least sectionally, preferably completely, between the medium and the heating unit in the region facing the medium.

Likewise, advantageously, the unit is embodied and/or arranged in such a manner that it has in parallel with the circumferential direction of a pipeline a higher, especially at least 10 times higher, especially at least 30 times higher, thermal conductivity than perpendicularly to the circumferential direction.

An especially preferred embodiment of the apparatus of the invention includes that the unit is dimensioned and/or arranged as a function of the heating signal in such a manner that a predeterminable amount of heat is transmitted from the heating element to the medium.

In this regard, at least one surface area of at least one surface subregion of the unit is preferably dimensioned as a function of the heating signal in such a manner that a predeterminable amount of heat is transmitted from the heating element to the medium.

The object of the invention is achieved, furthermore, by a method for producing an apparatus of the invention, wherein a heating element is arranged in such a manner that the heating element is at least partially and/or at times in thermal contact with the medium, and wherein a unit comprising a material with an anisotropic thermal conductivity is arranged in at least a subregion between the medium and the heating element.

In an embodiment of the method, the heating element and/or the unit are/is arranged at least partially in a sensor head.

Another embodiment of the method includes that the unit is placed on a wall of the pipeline, wherein the heating element is placed at least sectionally on the unit in such a manner that the heating element is arranged in the medium far region of the unit.

It is to be noted here that the embodiments explained in connection with the apparatus can be applied mutatis mutandis also for the proposed method and vice versa.

BRIEF DESCRIPTION OF THE DRAWINGS

The invention will now be explained in greater detail based on the appended drawing, the figures of which show as follows.

Figure 1:
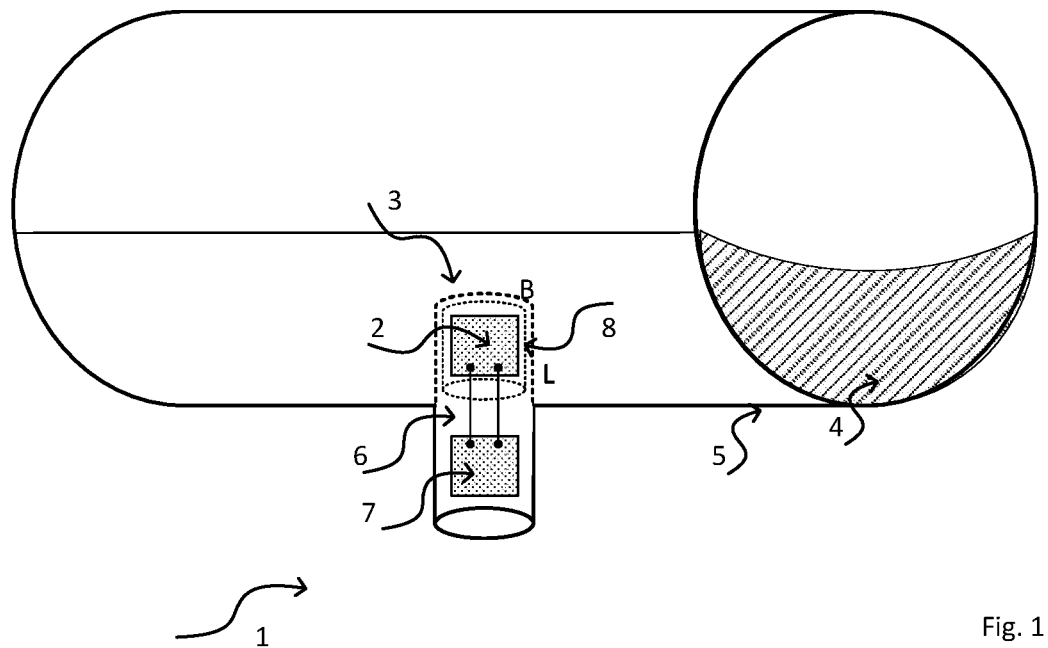
FIG. 1 shows a schematic view of a flowmeter, in the case of which a heating element and a unit of the present disclosure are arranged in a sensor head.

Equal features are provided in the figures with equal reference characters.

DETAILED DESCRIPTION

FIG. 1 shows a thermal flowmeter 1, in the case of which a heating element 2 is arranged in a sensor head 3. The sensor head 3 protrudes, in turn, into a pipeline 5 conveying a medium 4. For applying the measurement device 1 on the pipeline 5 in the context of the present invention, all options well-known to those skilled in the art are possible and fall within the scope of the present invention.

By means of the sensor head 3, the heating element 2 is at least partially and at least at times in thermal contact with the medium 4. In the present example, sensor head 3 is cylindrically embodied—the present invention, is, however, not limited to cylindrical symmetries of the sensor head 3. In other embodiments of the present invention, the device can, furthermore, also comprise two heating elements 2 or a heating element 2 and an additional temperature sensor [not shown]. By means of the connection wires 6, the heating element 2 is connected with an electronics unit 7, which serves for signal registration,—evaluation and—feeding. It is to be noted here that the number of connection wires used can vary from embodiment to embodiment.

In operation, the heating element 2 can be operated for determining flow or flow velocity, for example, as a result of delivery of a variable heating power P for heating to a predeterminable temperature T or by delivery of a constant heating power P at variable temperature T. Fundamentally, there occurs, thus, a heat exchange between the measurement device 1 and the medium 4, or a heat flow, or a heat flux, from the heating element 2 to the medium 4. In such case, the thermal junction resistance between the heating element 2 and the flowing medium 4 changes, in each case, as a function of the reigning flow velocity v.

For purposes of a high accuracy of measurement, one must assure that the heat flow from the heating element 2 to the medium 4 is as homogeneous as possible. For example, the heat flux from the heating element 2 to the medium 4 can lead to an anisotropic heat flow due to the particular, especially the structural, arrangement in the flowmeter 1. Different distances between different regions of the heating element 2 and the medium as well as the quality of the different contactings within the measurement device 1 can be named here, by way of example. As a result, the thermal junction resistance is, in practice, dependent not only on the mass flow, but, also, likewise on the flow direction of the medium 4, and on the conditions of the installation, for example, the positioning relative to the flow direction of the medium 4. This is especially problematic, when the measurement device 1 is exposed to an at least at times and/or partially dynamic and/or inhomogeneous thermal environment, for example, for an application in a flowing medium 4 with variable flow direction, for example, in the case of an inhomogeneous flow profile.

According to the invention, the thermal flowmeter 1 applies a unit 8 comprising a material with an anisotropic thermal conductivity for preventing measurement inaccuracies caused by such problems. For example, the unit is composed at least partially of graphite. Unit 8 is arranged in at least one subregion between the medium and the heating element 2. In the present example of an embodiment, it is arranged together with the heating element 2 in the sensor head 3 and surrounds the heating element 2. A heat flow emanating from the heating element 2 can correspondingly be influenced, with targeting, by means of the unit 8, especially with respect to the propagation direction of the particular amount of heat.

In the present example of an embodiment, unit 8 is a thin film in the form of a cylindrical sleeve with a base surface B and a lateral surface L, which completely surrounds the heating element 2 in the region facing the medium 4. Other possible embodiments for a unit 8 of the invention can be taken, for example, from the previously unpublished German patent application 102017100267.7. Furthermore, in an additional manufacturing step, remaining hollow spaces within the sensor head 3 can be filled with a suitable, especially electrically insulating, filler [not shown], especially a cement.

Since the thermal conductivity of the unit 8 is directionally dependent, the heat flow from the heating element 2 to the medium 4 for measurement device 1, in given cases, for a certain contemplated application, can, with targeting, be advantageously influenced. In the present example, the unit 8 assures that the heat flow to the medium 4 is isotropic.

Preferably, unit 8 is embodied to assure that the thermal junction resistance is always independent of the direction that the medium 4 flows against the sensor head 3, i.e. independent of the reigning flow profile of the medium 4. Likewise, unit 8 preferably assures that the thermal junction resistance is independent of certain production tolerances and structurally related, asymmetric, geometric conditions in the region of the measurement device 1, especially in the region of the sensor head 3. In the present example, the thermal conductivity of the unit 8 is preferably greater in the circumferential direction, thus, in parallel with lateral surface L of the cylindrically embodied film, than perpendicularly thereto. The heat flow to the medium 4 occurs, thus, independently of the arrangement of the heating unit 2 within the sensor head 3, outwardly from the wall of the sensor head 3 homogeneously in all directions.

Figure 2:
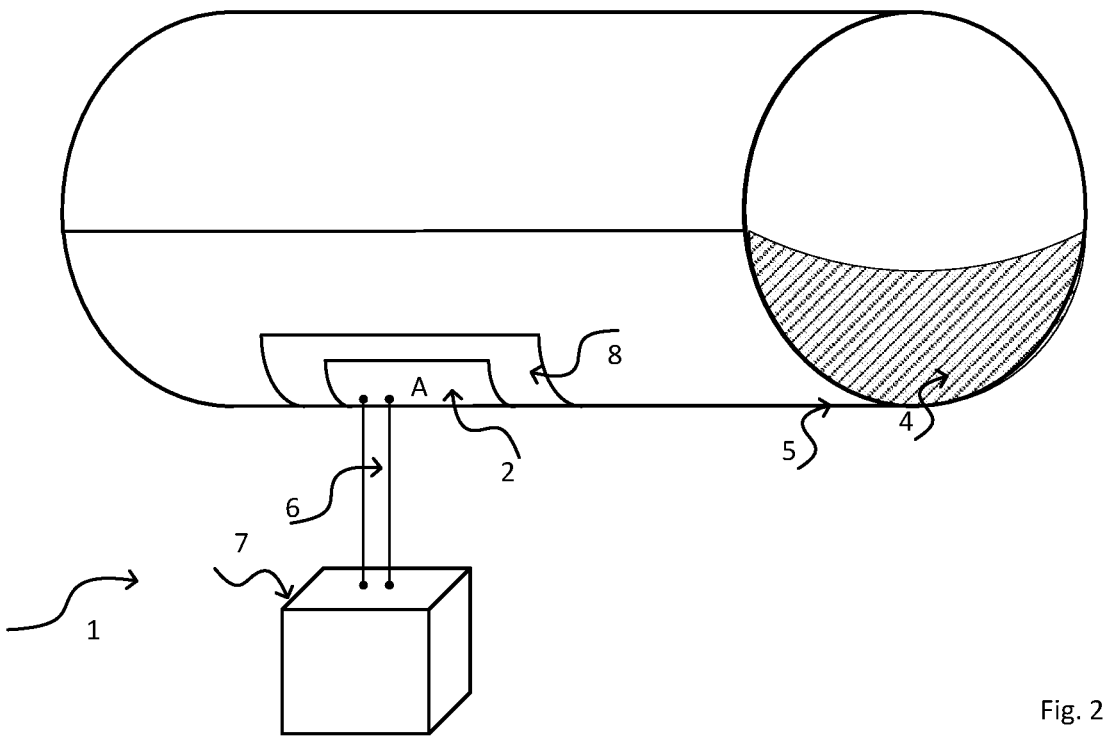
FIG. 2 shows a schematic view of a flowmeter, in the case of which the unit and the heating element are placed on a wall of the pipeline.

A second possible embodiment of a thermal flowmeter 1 of the invention is shown in FIG. 2. In this example, the unit 8 and the heating element 2 are applied on the outer wall of the pipeline 5 conveying the medium 4. Alternatively, the unit 8 and/or the heating element 2 can also be integrated at least partially into the pipeline 5. In each case, unit 8 is located between the heating element 2 and the medium 4.

Unit 8 can, for example, be embodied, just as in the case of FIG. 1, as a thin film, or even as a coating applied on the pipeline 5. In this embodiment, the thermal conductivity of the unit 8 is preferably greater in parallel with the wall of the pipeline 5, thus, along the area A, than perpendicularly thereto. An amount of heat outgoing from the heating element 2 is, thus, first propagated along the area A and then from the unit 8 via the wall of the pipeline 5 to the medium 4.

The electronics unit 7 in FIG. 2 is arranged, for example, separately from the sensor head 3 and connected by means of the connection lines 6 with the heating element 2. Alternatively, a separately arranged electronics unit 7 can also be used for the embodiment in FIG. 1, or the flowmeter 1 of FIG. 2 can be embodied in compact construction, such as shown in FIG. 1.

The geometric embodiment and dimensioning of the unit 8 determines the size of a so-called heating surface and can according to the invention be selected in such a manner that unit 8 transmits to the medium 4 a predeterminable amount of heat from the heating element 2 as a function of the used heating signal. In the case of FIG. 1, the heating surface can, for example, be suitably selected as a result of variation of the lateral surface L, or of the area of the lateral surface L of the unit 8; in the case of the embodiment of FIG. 2, in contrast, the surface area of the area A in parallel with wall of the pipeline 5 can be varied.

Figure 3:
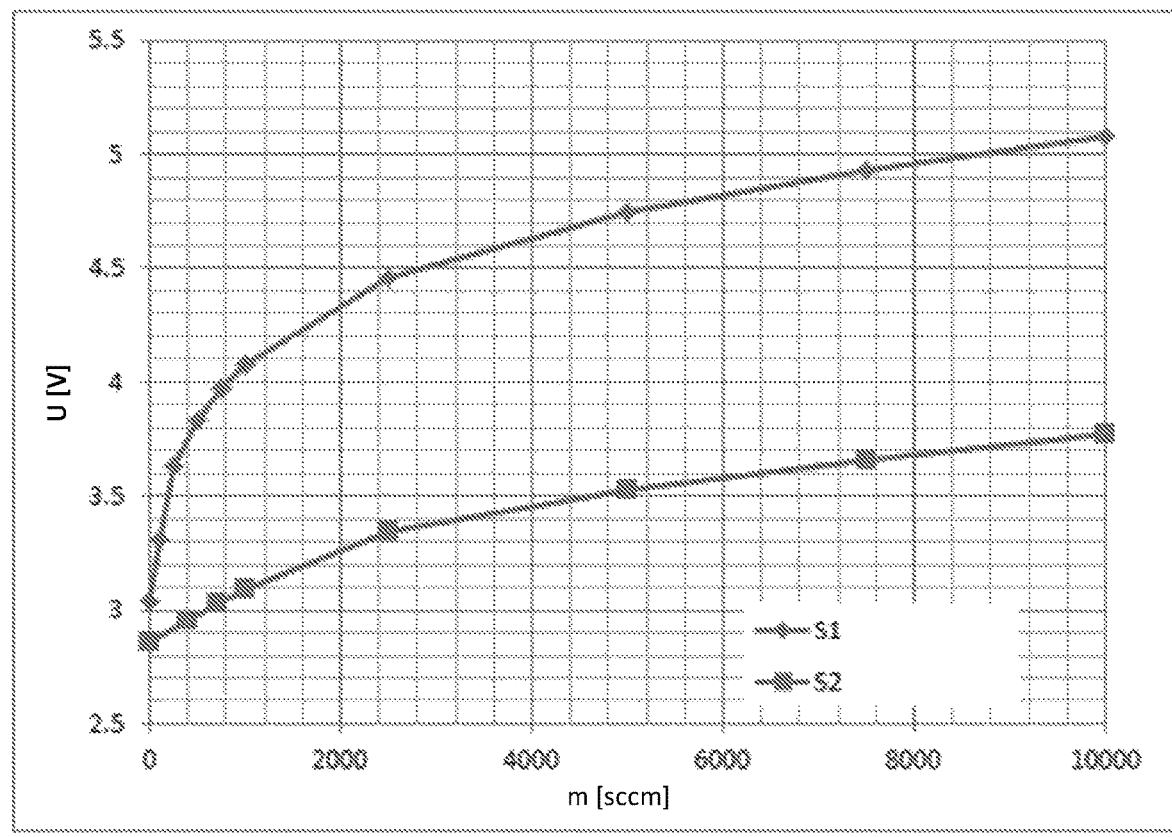
FIG. 3 shows a schematic graph illustrating the influence of geometric embodiment of the unit on determining flow.

FIG. 3 shows, by way of example, for two measuring devices 1 each with the same heating elements 2 arranged in equally embodied sensor heads 3 and two units 8 of the same material with, however, different areas of the lateral surfaces L, in each case, a so-called sensor characteristic curve, showing heating voltage U as a function of mass flow m. In such case, the characteristic curve S1 is for a small lateral surface area L and the characteristic curve S2 for a large lateral surface area L. The exact sizes of the lateral surface areas are unimportant, since here the purpose is only to show the relative behavior. The characteristic curve can be influenced, with targeting, by suitable choice of the area of the unit 8. Thus, for example, an increase of the heating surface area, which can be achieved, for example, by a distribution of the same heating power over a greater area by means of the unit 8, leads to a flatter characteristic curve. In this way, an enlarged dynamic range can be covered. In contrast, lesser heating surface areas are advantageous in the case of higher desired sensitivities of the particular measuring device and especially in the case of low flow velocities. Unit 8 enables, thus, not only a homogenizing of the heat distribution, but, also the opportunity of a targeted selecting of the sensor characteristic course for a certain application, for example, depending on the flow conditions of the medium 4.

The invention claimed is:

1. An apparatus for determining and/or monitoring mass flow and/or flow velocity of a flowable medium through a pipeline, the apparatus comprising:
   at least one heating element, which is at least partially and/or at times in thermal contact with the medium and which is operable at least at times via a heating signal; and
   a unit having a longitudinal axis and comprising a material with an anisotropic thermal conductivity disposed in at least a subregion between the medium and the heating element,
   wherein the unit comprises a layer or a coating, which layer or coating is composed at least partially of the material with an anisotropic thermal conductivity, or a thin film composed at least partially of the material with an anisotropic thermal conductivity, and wherein the unit is configured as to have a higher thermal conductivity along the longitudinal axis than perpendicular thereto.

2. The apparatus of claim 1, wherein the material with an anisotropic thermal conductivity is a material at least partially containing carbon.

3. The apparatus of claim 1, wherein the material with an anisotropic thermal conductivity is a material at least partially containing hexagonal boron nitride.

4. The apparatus of claim 1, wherein the heating element and/or the unit are at least partially disposed in a sensor head.

5. The apparatus of claim 4, further comprising a filler, which is disposed at least partially within the sensor head and which at least partially fills an inner space of the sensor head.

6. The apparatus of claim 4, wherein the unit is configured and/or arranged such that a thermal conductivity of the unit is greater in a circumferential direction of the sensor head than in a direction perpendicular to the circumferential direction.

7. The apparatus of claim 4, wherein the unit is configured and/or arranged such that a thermal conductivity of the unit is at least 10 times greater in a circumferential direction of the sensor head than in a direction perpendicular to the circumferential direction.

8. The apparatus of claim 1, wherein the unit is secured to a wall of the pipeline or is integrated into the pipeline.

9. The apparatus of claim 8, wherein the heating element is disposed, at least sectionally, on the unit such that the heating element is disposed in a medium far region of the unit.

10. The apparatus of claim 8, wherein the unit is configured and/or arranged such that a thermal conductivity of the unit is greater in parallel with a circumferential direction of the sensor head than in a direction perpendicular to the circumferential direction.

11. The apparatus of claim 8, wherein the unit is configured and/or arranged such that a thermal conductivity of the unit is at least 10 times greater in parallel with a circumferential direction of the sensor head than in a direction perpendicular to the circumferential direction.

12. The apparatus of claim 1, wherein the unit is dimensioned and/or arranged as a function of the heating signal such that a predeterminable amount of heat is transmitted from the heating element to the medium.

13. The apparatus of claim 12, wherein at least one surface area of a surface subregion of the unit is dimensioned as a function of the heating signal such that a predeterminable amount of heat is transmitted from the heating element to the medium.

14. A method for producing an apparatus for determining and/or monitoring mass flow and/or flow velocity of a flowable medium through a pipeline, the method comprising:
    providing at least one heating element, which is at least partially and/or at times in thermal contact with the medium and which is operable at least at times via a heating signal; and
    providing a unit having a longitudinal axis and comprising a material with an anisotropic thermal conductivity, wherein the unit is disposed in at least a subregion between the medium and the heating element, and
    wherein the unit comprises a layer or a coating, which layer or coating is composed at least partially of the material with an anisotropic thermal conductivity, or a thin film composed at least partially of the material with an anisotropic thermal conductivity, and
    wherein the unit is configured as to have a higher thermal conductivity along the longitudinal axis than perpendicular thereto.

15. The method of claim 14, wherein the heating element and/or the unit are disposed at least partially in a sensor head.

16. The method of claim 14, wherein the unit is attached on a wall of the pipeline, and wherein the heating element is disposed at least sectionally on the unit such that the heating element is disposed in the medium far region of the unit.

* * * * *